United States Patent
Wagstaff et al.

(10) Patent No.: US 10,367,692 B2
(45) Date of Patent: Jul. 30, 2019

(54) RULES IMPLEMENTATION SYSTEM

(71) Applicant: BSQUARE CORP., Bellevue, WA (US)

(72) Inventors: David Wagstaff, Lake Forrest, CA (US); Matthew Honaker, Seattle, WA (US); Divya Krishnan, Kenmore, WA (US)

(73) Assignee: BSQUARE CORP., Bellevue, WA (US)

( * ) Notice: Subject to any disclaimer, the term of this patent is extended or adjusted under 35 U.S.C. 154(b) by 45 days.

(21) Appl. No.: 15/878,330

(22) Filed: Jan. 23, 2018

(65) Prior Publication Data

US 2018/0212830 A1 Jul. 26, 2018

Related U.S. Application Data

(60) Provisional application No. 62/449,207, filed on Jan. 23, 2017.

(51) Int. Cl.
| | |
|---|---|
| *G06F 15/173* | (2006.01) |
| *H04L 12/24* | (2006.01) |
| *G06N 5/04* | (2006.01) |
| *H04L 12/26* | (2006.01) |
| *G05B 15/02* | (2006.01) |

(52) U.S. Cl.
CPC ......... *H04L 41/0893* (2013.01); *G06N 5/047* (2013.01); *H04L 41/22* (2013.01); *H04L 43/16* (2013.01); *H04L 43/50* (2013.01); *G05B 15/02* (2013.01)

(58) Field of Classification Search
CPC ......... H04L 69/30; H04L 69/26; H04L 69/18; H04L 41/0893; H04L 41/22; H04L 43/16; H04L 43/50; G06N 5/047
See application file for complete search history.

(56) References Cited

U.S. PATENT DOCUMENTS

| | | | | |
|---|---|---|---|---|
| 6,567,881 | B1 * | 5/2003 | Mojaver | G06F 13/4031 710/110 |
| 6,928,054 | B1 * | 8/2005 | Montuno | H04L 29/06 370/235 |
| 7,729,322 | B2 * | 6/2010 | Abrol | H04L 69/324 370/310 |
| 2002/0199019 | A1 * | 12/2002 | Battin | H04L 29/06 709/245 |
| 2014/0098671 | A1 * | 4/2014 | Raleigh | H04L 69/14 370/235 |

* cited by examiner

*Primary Examiner* — Jonathan A Bui
(74) *Attorney, Agent, or Firm* — Rowan TELS LLC

(57) ABSTRACT

A system and method receive raw data signals from a variety of edge devices. Observations are processed via a rule engine which may be preconfigured via a rule generator to implement a series of actions on remote or locally controlled machines. Rules are generated via a configurable user interface and may also be dynamically generated based on data received from the edge devices.

26 Claims, 13 Drawing Sheets

RULES IMPLEMENTATION SYSTEM

BACKGROUND

In many cases an embedded system is deployed in the field and forgotten. Meanwhile, technology evolves and changes around the deployed system. Older deployed systems have serial interfaces to gain access to the device and information it contains. As the internet has become prevalent, users wish to access their devices without having to go personally to the device and plug in a computer to download data. Consequently, a demand arose to internet enabling the older devices by creating products that have a serial port on one end and an Ethernet port on the other end, which can accept the data from the device and send the data over the internet. This is advantageous because it eliminates the need to do costly replacements for the device.

Embedded systems today can be connected to computer networks (for example, the internet) and to legacy devices. These embedded systems allow connectivity with various equipment, legacy as well as state of the art. For example, an embedded system allows network/internet connectivity to vending machines, refrigerators, utility meters, HVAC systems, and home entertainment systems.

Another problem is the ever-growing number of network enabled devices that have inadequate monitoring and control capabilities. These problems are pervasive, involving all manner of equipment from fax machines, printers, copiers and other office equipment, to specialized devices found in manufacturing plants, home appliances, hand-held electronics such as cameras, audio/video players and medical devices that have network capability but are not part of an integrated network. This problem is particularly acute for the administrators, who often find themselves spending a great deal of money and time bridging heterogeneous management systems. Most of these devices do not contain state information and are even more difficult to manage. A more homogeneous management environment can save time and money, but numerous vendors have many valid business and technical reasons for avoiding homogeneous management systems.

Device management functionality comes in many different forms depending on the administrator's needs and the capabilities of the target device. Common management functions include monitoring the device's critical information, taking an inventory of the device's subsystems, logging interesting events that take place, sending alerts to an administrator, recovering the device if the power fails, ensuring the data is secure, asset tracking, or reporting information to an administrator. Administrators also employ more advanced management functions including scripting or programming, aggregating device data from multiple devices, diagnostics, taking action based on the device data content, trending device data, reporting information in a final format including a spreadsheet or graph, or translating from one management format to another. A major area of management functionality includes securing the device through providing confidentiality of data, data integrity, administrator authentication, device authentication, risk mitigation, countermeasures, or protection against hostile environments and threats.

Further, there is an ever-increasing need for systems of normally independent embedded devices to operate as an interconnected distributed method, allowing a centralized authority to dictate rules by which the system operates while still having functionality to allow the system to learn and implement those rules.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Description

Figure 1:
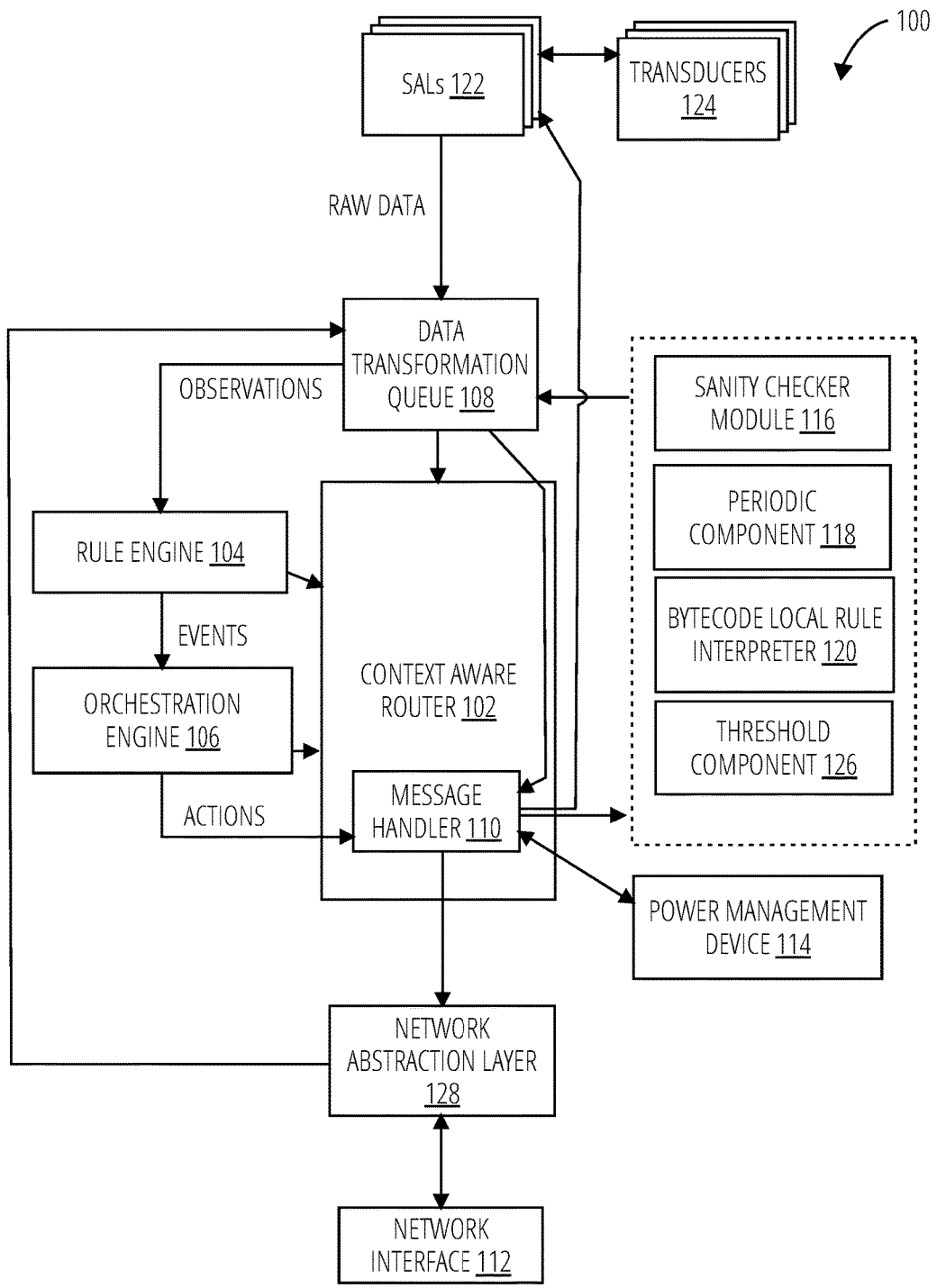
FIG. 1 illustrates an embodiment of a rules implementation system 100.

References to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other. Any terms not expressly defined herein have their conventional meaning as commonly understood by those having skill in the relevant art(s).

"Circuitry" in this context refers to electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes or devices described herein, or a microprocessor configured by a computer program which at least partially carries out processes or devices described herein), circuitry forming a memory device (e.g., forms of random access memory), or circuitry forming a communications device (e.g., a modem, communications switch, or optical-electrical equipment).

"Firmware" in this context refers to software logic embodied as processor-executable instructions stored in read-only memories or media.

"Hardware" in this context refers to logic embodied as analog or digital circuitry.

"Logic" in this context refers to machine memory circuits, non transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

"Programmable device" in this context refers to an integrated circuit designed to be configured and/or reconfigured after manufacturing. The term "programmable processor" is another name for a programmable device herein. Programmable devices may include programmable processors, such as field programmable gate arrays (FPGAs), configurable hardware logic (CHL), and/or any other type programmable devices. Configuration of the programmable device is generally specified using a computer code or data such as a hardware description language (HDL), such as for example Verilog, VHDL, or the like. A programmable device may include an array of programmable logic blocks and a hierarchy of reconfigurable interconnects that allow the programmable logic blocks to be coupled to each other according to the descriptions in the HDL code. Each of the programmable logic blocks may be configured to perform complex combinational functions, or merely simple logic gates, such as AND, and XOR logic blocks. In most FPGAs, logic blocks also include memory elements, which may be simple latches, flip-flops, hereinafter also referred to as "flops," or more complex blocks of memory. Depending on the length of the interconnections between different logic blocks, signals may arrive at input terminals of the logic blocks at different times.

"Software" in this context refers to logic implemented as processor-executable instructions in a machine memory (e.g. read/write volatile or nonvolatile memory or media).

A method is disclosed to collect data from edge devices and to adapt the devices to improve their semi-autonomous operation. Conventional systems of this nature are complex and inflexible. The current method may be driven entirely remotely and/or locally and has a flexible architecture that can easily be modified to port onto different hardware platforms and operating systems, use available network connectivity on the target device, and use a protocol that is best utilized by the back end method.

Drawings

Referring to FIG. 1, a rules implementation system 100 comprises a context aware router 102, a rule engine 104, an orchestration engine 106, a data transformation queue 108, a message handler 110, a network interface 112, a power management device 114, a sanity checker module 116, a periodic component 118, a bytecode local rule interpreter 120, a SALs 122, a transducers 124, a threshold component 126, and a network abstraction layer 128.

The context aware router 102 may comprise the data transformation queue 108 and the message handler 110. The data transformation queue 108 may receive messages from system components and transfer those messages to the message handler 110 to be processed. The message handler 110 determines the system component to send a message received from the data transformation queue 108 and sends the message to that component. The context aware router 102 may process messages by processing all the available messages in the data transformation queue 108. The context aware router 102 may handle all the messages in the method. The messages are passed into the context aware router 102 and put into a single queue, data transformation queue 108. The context aware router 102 may process these on a simple first-in, first-out basis. Components register with the context aware router 102 to indicate that they are interested in messages (e.g., sending, receiving, processing, etc.). This includes internal components (e.g., the LED SAL component may register to indicate that LED messages are of interest), and external sources (e.g., an external source may ask to be notified of button messages, or specific changes). The context aware router 102 stores all of these registrations into a routing table. For each message, the context aware router 102 processes it against the routing table. The message is passed on to all parties who have registered with the context aware router 102, and who are interested in the message being processed. There is a function that allows objects to filter messages at a high level, so that objects in the method do not have to inspect and process all messages.

The messages passed around the method include fields, such as, a SourceID, the message origin; MessageType (e.g., Get, Set, Response, Callback Request, etc.); ServiceID, the service the message pertains to; TopicID, the topic the message pertains to; AttributeID the attribute the message pertains to; and Value, the associated value of the attribute. Some of these fields may be optional for certain message types. Messages carry data and commands between the various components that comprise the system. There is an internal representation of a message that is used by software and an external representation that is sent across networks using a message bus. Messages may be converted from internal and external representation when entering or exiting the network layer.

An internal message may be composed of a set of header fields and a set of payload fields. The header may define the intent of the message while the payload contains the data required to define that intent. Header fields may define the purpose and recipient of a message and may include: Identifier; Type; Timestamp; Correlation Identifier; Source; Destination; and Quality of Service.

An external message may utilize a common messaging format to define the supported requests and responses that can be made. This message format may be transparent to the underlying network protocol. An external message may be a request or a response. Requests are sent to an edge device to retrieve a value or perform an action. Responses are sent from an edge device to return the result of a Request.

A message contains a set of common header fields including: message Id and message type, such as, 0—Topic Get Request, 1—Topic Set Request, 2—Operation Request, 3—Report Request, 4—Topic Set Response, 5—Topic Get Response, 6—Report Response, 7—Command Response, 8—Internal Indication, and 9—Byte Code message; a source, an identifier of the source of the message, which may be set by the client or added by the gateway that handles the initial message; a timestamp, which may be set by the client or added by the gateway that handles the initial message;

quality service, the quality of service level associated with the message, which may be 0, 1, or 2; and an authentication.

Response messages may add additional headers including: a success, the result of the corresponding request message, wherein true indicates that the request was successful and false indicates that it was not (A failed response may not comprise a payload); a and correlation Id, the messages that are sent in response to a request sets the correlation id of the message to that of the requests message id. The correlation Id may be used by the central control 402 to ensure that response message are coordinated appropriately to ensure that the control commands and rule updates are generated appropriately. For example, the correlation Id may be used to determine that data from one transducer of the transducers 124 was not generated on a specific time interval or in a specific location.

Messages can be encapsulated in a number of different formats, including JSON. JSON message fields may include: "0" message ID; "1" message Type; "2" Service Id; "3" Topic Id; "5" Attribute List; "6" Correlation Id; and "7" Success Attribute. Messages can be serialized using JSON for transmission across the network. An example of a set request message follows:

```
{
"0": 1,
"1": 1,
"2": 1,
"3": 2,
"5": [ {"1015": 1} ]
}
```

The network interface 112 may abstract away the external communications interface to the outside world. When the network interface 112 is created, it may be configured to use a certain connection type, transport protocol, and destination (e.g., a listening server or message broker). The network interface 112 decodes incoming messages and encodes the outgoing messages in relation to the specific protocol being used in the method (e.g, MQTT-SN, HTTP, etc). The network interface 112 registers with the context aware router 102 and sends any messages that are not of type 'internal' out via a connected mechanism. The network interface 112 is implemented in a componentized way by one or more IALs (Interface Abstraction Layers) to allow a swap between different hardware interfaces. In some embodiments, an IAL may be present for each type of network interfaced with the rules implementation system 100 (e.g., Wifi, GRPS, etc.) The framework may support multiple IALs concurrently to allow several communications channels to be used. If there is more than one IAL, the network abstraction layer 128 may arbitrate and prioritize how messages are sent and received.

The sanity checker module 116 provides a way of running a number of "sanity tests" as well as providing a debug view of all the messages the context aware router 102 processes. The sanity checker module 116 implements some simple test cases for each of the SALs 122. These test cases may typically post a get request message and will then check the response message ensuring that the message returned is correctly formatted and that the data is within predetermined bounds. If the message is incorrectly formed or the data is not within predetermined bounds, a notification message is created and sent by the system to a notification device. Tests may be setup by adding them to the test queue in the construction of the sanity checker module 116, which then automatically starts the tests as soon as the main processing loop begins. The sanity checker module 116 checks the get response messages of each of the SALs 122 and ensures they are correctly formatted and have valid values in them. The sanity checker module 116 also reports all messages that go through the method and in some cases such as get response messages it also reports the attributes contained within that message. Reports from the sanity checker module 116 may be printed across a serial port.

The periodic component 118 allows regular controlling and reporting of data readings. The periodic component 118 issues requests for the SALs 122 to perform actions at regular time intervals. For example, it could inform a GPS SAL to send a location report every 600 seconds, or for the LED SAL to change color every 10 seconds. The periodic component 118 is configured to issue periodic events by sending a message with a 'periodic' attribute. The periodic component 118 captures the messages with this attribute and re-transmits appropriate messages at the requested interval. For example, to request a temperature reading every 10 seconds: first, an external entity sends a message into the rules implementation system 100 to request the temperature on a 10 second periodical basis; second the temperature SAL will ignore this message (even though the serviceID and TopicID suggest the message is destined for the temperature SAL, it is not of the right 'type'), but the periodic component 118 captures and stores the message; third, the periodic component 118 will issue messages to ask the temperature SAL to report temperature, doing so every 10 seconds. To cease the periodic reporting, an entity sends a message requesting the period on a 0 interval basis. The periodic component 118 may handle more than one periodic request at the same time. It may store the periodic requests in a table and keep track of when messages are due.

The bytecode local rule interpreter 120 is a bytecode interpreter that may be configured with bytecode from the main rule engine 104, essentially allowing defined rules to be processed on the device. The bytecode messages share a common message format, which may be: {message ID, message Type, Service ID, Bytecode message Header, Bytecode Script}. An exemplary message may be: {"0": 44, "1": 9, "2": 0, "10": [13354593, 0, 1], "9" [{"8": 19}, {"1": 0}, {"8": 18}]}.

The bytecode message header field indicates extra data about the message; it may comprise 3 fields, the unique id of the rule, the type of bytecode message, and an optional field. Bytecode message types may include: Master Rule message—0; Predicate message—1; Consequence message—2; Header message—3; and Footer message—4. The optional field encodes different data depending on the message type. The optional field for each bytecode message type may comprise: Master Rule message—Number of predicates; Predicate message—Predicate Index; Consequence message—Number of predicates; Header message—Timestamp; and Footer message—Number of rules.

The header and footer messages may not comprise a bytecode script. A bytecode script is made up of collections of pairs of data that indicate a data type and its value (e.g., {"8": 19}, wherein "8" indicates the data type, here 8 represents a bytecode and the second value, 19, indicates the bytecode instruction to be performed).

The power management device 114 is configured to wake up on appropriate events and then put the rules implementation system 100 into a low power state. Each of the SALs 122 encapsulates the capture and/or control functionality behind a single hardware input/output device, or another part of the method (e.g., wear information, method health, sales data, faults, etc.). the SALs 122 may be grouped in some way (e.g., Hardware SALs 122, Software SALs 122). In some cases, a single hardware device (with multiple bits of I/O) may have multiple SALs 122. For example, a thermostat with a temperature sensor and a warning LED may have 2 SALs 122, one for the temperature sensor and one for the LED. The SALs 122 handle Get/Set requests to the sensors. The SALs 122 may send and receive messages, and do so via the context aware router 102 object. If an interrupt occurs, the sensor associated with that interrupt will typically post a message to the context aware router 102. In those cases where the handling of the interrupt needs to be deferred (and possibly for all cases), the SALs 122 may post a 'Callback' message so that the context aware router 102 returns to the SALs 122 to complete the interrupt processing when no further interrupts are pending.

The rule engine 104 may receive observations (data) from the data transformation queue 108 and process those through a rule set and transmit events to the orchestration engine 106 and forward signals to the context aware router 102. The rule engine 104 may receive rule which have been manually configured by a user or have been dynamically generated by an edge device, or based on data from an edge device (or group of devices, or other part of the system).

The transducers 124 may comprise a single hardware input/output device. Each of the transducers 124 may be associated with one or more of the SALs 122. The transducers 124 may send a signal to the SALs 122 indicating a specific machine state and receive a signal to alter the machine state in response to that signal.

The threshold component 126 allows for the reporting of data readings when those data readings are outside a particular range.

The network abstraction layer 128 may receive messages from the message handler 110 and the network interface 112, and send messages to the data transformation queue 108 and the network interface 112.

Figure 2:
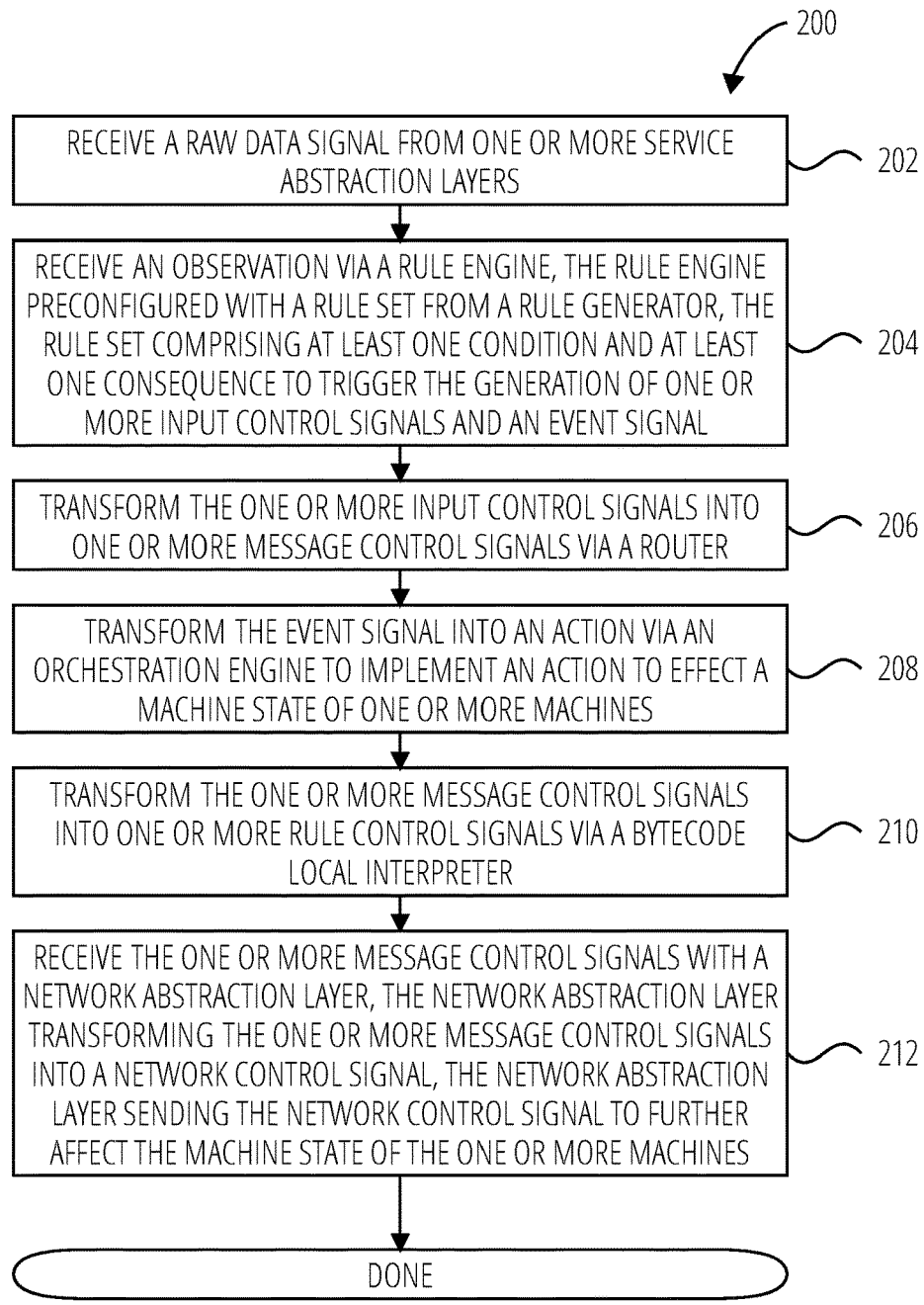
FIG. 2 illustrates an embodiment of a rules implementation process 200.

Referring to FIG. 2, the rules implementation process 200 receives a raw data signal from one or more service abstraction layers (block 202).

The rules implementation process 200 receives an observation via a rule engine, the rule engine preconfigured with a rule set from a rule generator, the rule set comprising at least one condition and at least one consequence to trigger the generation of one or more input control signals and an event signal (block 204).

The rules implementation process 200 transforms the one or more input control signals into one or more message control signals via a router (block 206).

The rules implementation process 200 transforms the event signal into an action via an orchestration engine to implement an action to effect a machine state of one or more machines (block 208).

The rules implementation process 200 transforming the one or more message control signals into one or more rule control signals via a bytecode local interpreter (block 210).

The rules implementation process 200 receives the one or more message control signals with a network abstraction layer, the network abstraction layer transforms the one or more message control signals into a network control signal, the network abstraction layer sending the network control signal to further affect the machine state of the one or more machines. (block 212).

A method may include receiving a raw data signal from one or more service abstraction layers; receiving an observation via a rule engine, the rule engine preconfigured with a rule set from a rule generator. The method may transform the one or more input control signals into one or more message control signals via a router and transform the event signal into an action via an orchestration engine to implement an action to effect a machine state of one or more machines. The one or more message control signals may be transformed into one or more rule control signals via a bytecode local interpreter; and/or receive the one or more message control signals with a network abstraction layer, the network abstraction layer may transform the one or more message control signals into a network control signal, the network abstraction layer sending the network control signal to further affect the machine state of the one or more machines.

The rule set may include at least one condition and at least one consequence to trigger the generation of one or more input control signals and an event signal. Such a method may further include a sanity testing component, the sanity testing component receiving a sanity test setup control signal, the sanity test setup control signal altering the sanity testing component to send a sanity test control signal to the router. The rule generator may be configured via a user interface. The rule generator may be positioned on an edge device. A periodic message component may also be implemented, the periodic message component receiving a periodic rules setup control signal, the periodic rules setup control signal altering the periodic message component to send a periodic rules control signal to the router. A method may further include a threshold detecting component, the threshold detecting component receiving a threshold setup control signal. The threshold setup control signal may include one or more thresholds, the threshold detecting component receiving the one or more message control signals. The threshold detecting component transforming the one or more message control signals into one or more threshold signals in response to the one or more thresholds may be exceeded. Such a method may further include one or more edge devices, the one or more edge devices sending the one or more input control signals to the router, the one or more edge devices receiving the one or more message control signals from the router, the machine state of the one or more edge devices altered by the one or more message control signals.

In some embodiments, the method, the one or more edge devices send an initiation control signal to the router. The initiation control signal may include instructions for the router to receive the one or more input control signals and send the one or more message control signals to the one or more edge devices. A method may further include one or more interface abstraction layers. A method may further include a power management component. The router may include a message control signal receiver and a message control signal sender. The message control signal sender may send the one or more message control signals to the one or more service abstraction layers. The message control signal sender sends the one or more message control signals to the network abstraction layer.

Figure 3:
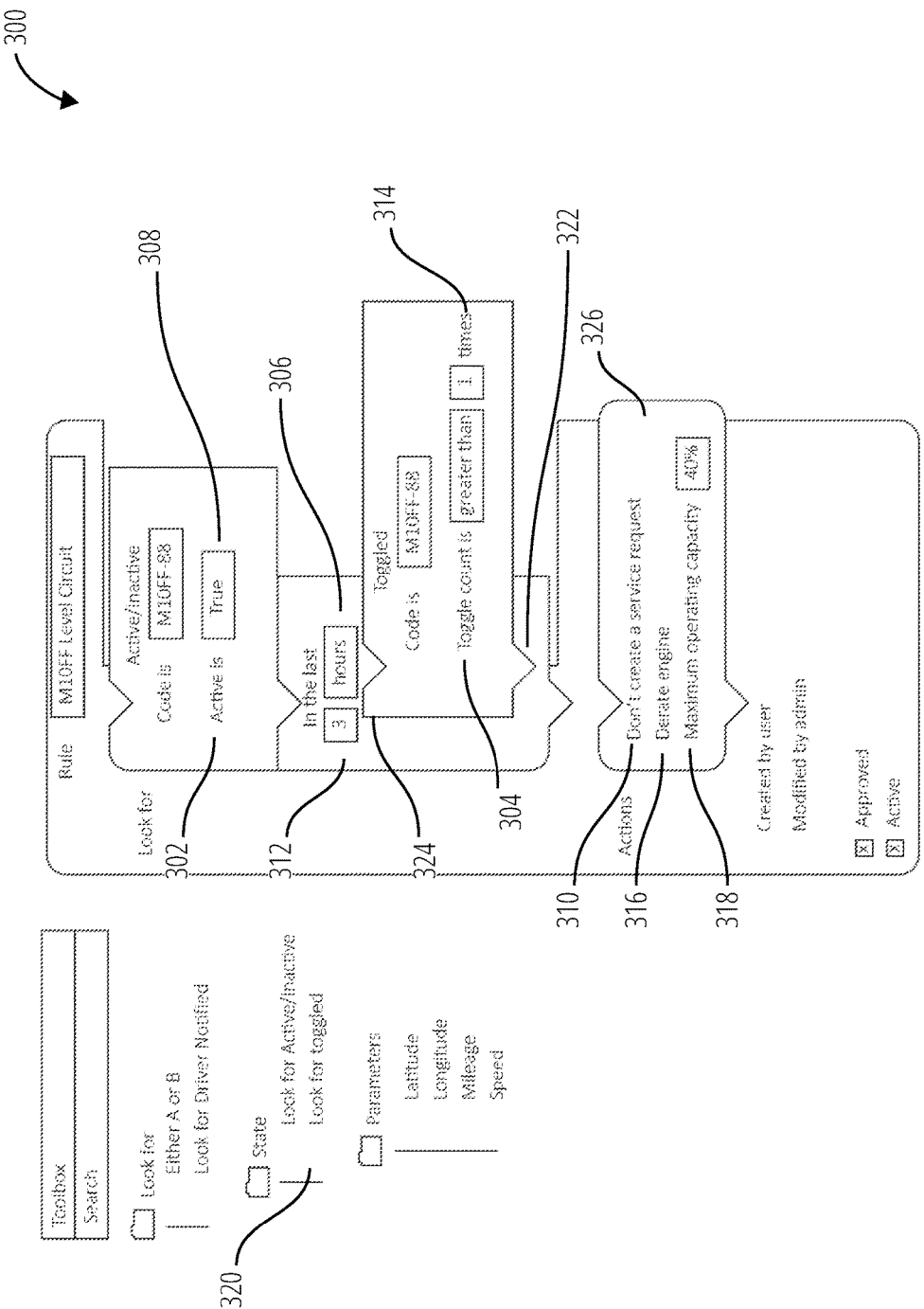
FIG. 3 illustrates an embodiment of a rule generator 300.

Referring to FIG. 3, a rule generator 300 comprises a first condition 302, a third condition 304, a second predicate 306, a first predicate 308, a first consequence 310, a second condition 312, a third predicate 314, a second consequence 316, a third consequence 318, a condition addition control 320, a decreasing priority control 322, an increasing priority control 324, and a consequence addition control 326.

The rule generator 300 generates logical expressions for processing events generated by sensors connected to a device. The rules generated by the rule generator 300 may be defined, for example, using a subset of the Drools Rule Language (DRL). A rule generated using a DRL file may then be cross-compiled into bytecode.

A rule may be composed of two main components, a Left Hand Side (LHS) and Consequence. The Left Hand Side (LHS) of a rule defines the conditions (e.g., the first condition 302, the second condition 312, and the third condition 304) that must evaluate to true for the rules consequence (e.g., the first consequence 310, the second consequence 316, and the third consequence 318) to be executed. The conditions that the LHS evaluates are defined as a collection of predicates (e.g., the first predicate 308, the second predicate 306, and the third predicate 314). The condition addition control 320 and the consequence addition control 326 may be utilized to add conditions or consequences, respectively. The decreasing priority control 322 and the increasing priority control 324 may be utilized to alter the priority of a condition or a consequence.

A predicate defines the expression that is evaluated over an event and its attributes. A predicate may evaluate as true or false. In some embodiments, a predicate can evaluate the expressions over an events attributes including the following: "Equal", "Not Equal", "Less Than", "Less Than or Equal", "Greater Than", "Greater Than or Equal", "Logical And", and "Logical Or". The predicate may be determined by the edge devices 408 or by the central control 402.

The event that matches a predicate may be captured and stored for later use. The event may be stored utilizing an operator, such as the ":" operator. Exemplary predicate include: "Billing(accountCurrent==true, predicatedBill>=500.00" and "$ connect: GridConnect (connectToGrid==false)".

A predicate may evaluate a chain of events utilizing logical operators, including the following: "And", "Or", "Not", and "Xor". An exemplary chain of events includes: "Billing(accountCurrent==true, predicatedBill>=500.0f) OR GridConnect(connectToGrid==false)".

The consequence may define the actions performed when the LHS of the rule evaluates to true. A consequence supports operations including the following: "Set event attribute", "Update event", "Delete event", and "Create event". Exemplary consequences include: "$connect.connectToGrid=false;" and "update($connect);". The consequence may be performed by the edge devices 408 or by the central control 402.

A rule may be composed of three types of bytecode instruction scripts. These scripts include master script, predicate script, and consequence script. Master script may decide what predicates to execute and if the rule passed or not. The master script may bind all the predicates together to form the LHS. In some embodiments, each rule has only one master script. The predicate script may execute and test whether a single predicate has been passed. The predicate script generates a list of events that have passed a predicate for later processing. In some embodiments, each rule may have at least one predicate. The consequence script performs the consequence of the rule, executing if a rule has been passed. In some embodiments, each rule may have only one consequence script.

To execute the rules, a ruleset may be uploaded to a device. A ruleset may comprise a header message; a number of rules which are made up of a master rule message, a number of predicate messages, and a consequence message; and a footer message, which ends the ruleset. The header message instructs the device that a new set of rules are arriving. The master rule message comprises the master rule script of a single rule and how many predicates that rule comprises. The predicate message comprises a single predicate script of a rule. The consequence message comprises the consequence script of a rule and marks the end of a single rule. The footer message comprises the number of rules sent and marks the end of the ruleset. In some embodiments, each of these messages must arrive in order (e.g., the order described herein).

Figure 4:
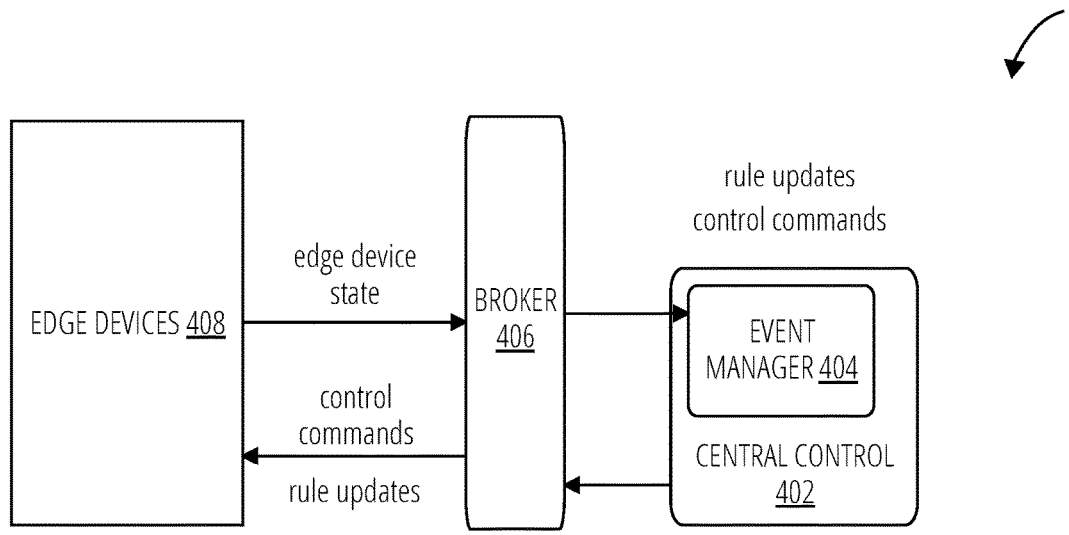
FIG. 4 illustrates an embodiment of a rules implementation system 400.
Figure 5:
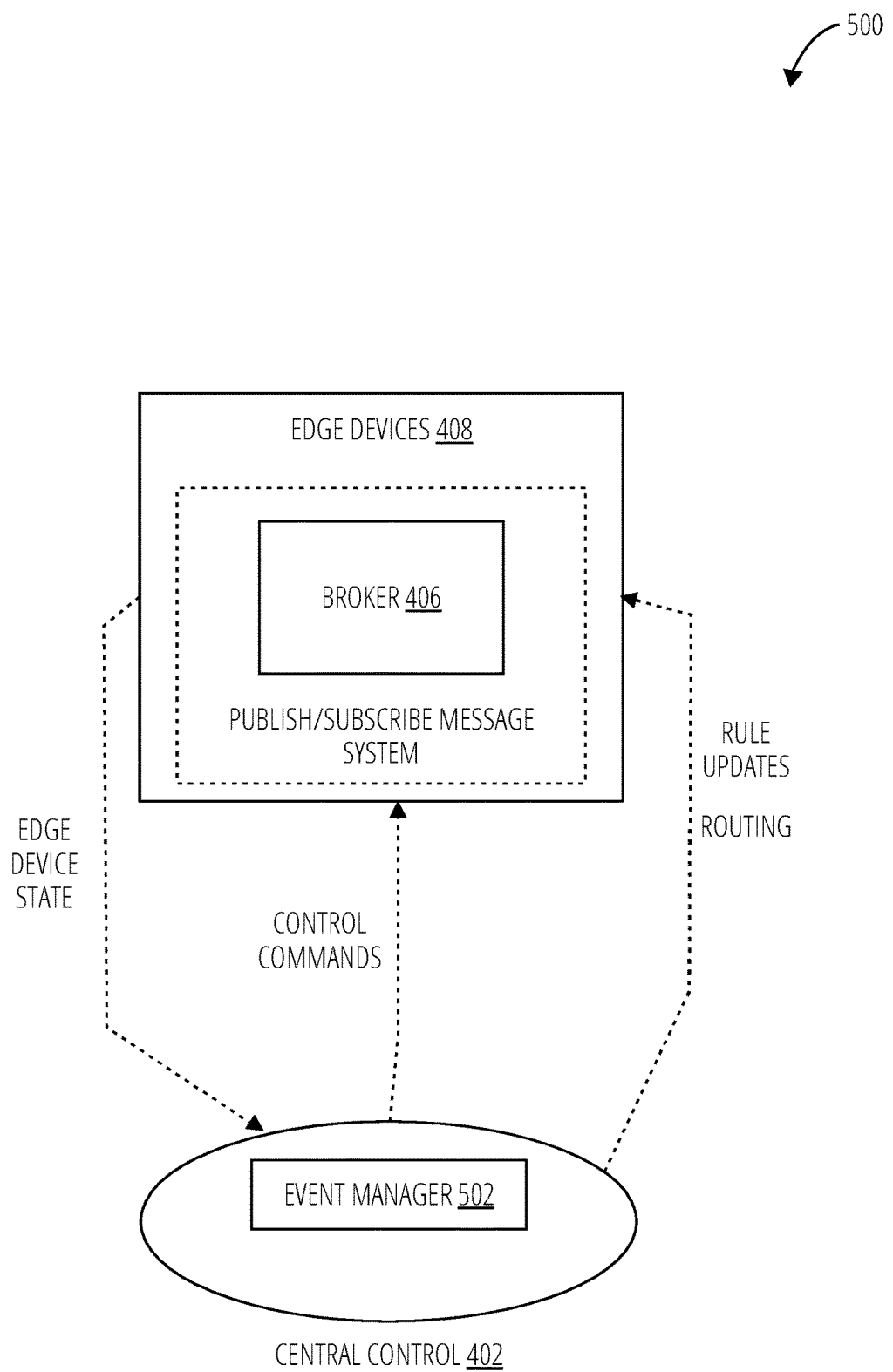
FIG. 5 illustrates an embodiment of a rules implementation system 500.

Referring to FIG. 4, a rules implementation system 400 comprises edge devices 408, a central control 402, and a broker 406. The central control 402 further comprises an event manager 404.

The edge devices 408 communicates the edge device state to the broker 406 and receives control commands and rule updates from the broker 406. The central control 402 sends control commands and rule updates to the broker 406 and receives signals from the broker 406.

The broker 406 receives the edge device state from the edge devices 408 and the control commands and rule updates from the central control 402. The broker 406 sends the control commands and the rule updates to the edge devices 408 and signals to the central control 402. A broker 406 may be utilized to perform functions that the edge devices 408 lack (e.g., some edge devices 408 may lack the capability to encrypt information). In some embodiments, the broker 406 may be located on the edge devices 408. The broker 406 may also be located on the same local area network as the edge devices 408. Each of the edge devices 408 may have a different broker 406. The edge devices 408 located on the same local area network may utilize the same broker 406.

The edge devices 408 communicates an edge device state to the central control 402. The edge devices 408 may communicate with the central control 402 directly or via a network (e.g., routers, hubs, servers, gateways, network bridges, modems, wireless access points, networking cables, line drivers, switches, and repeaters, and also include hybrid network devices such as multilayer switches, protocol converters, bridge routers, proxy servers, firewalls, network address translators, multiplexers, network interface controllers, wireless network interface controllers, ISDN terminal adapters, WAN, LAN, WWW, etc.).

The central control 402 communicates control commands and rule updates to the edge devices 408. The central control 402 may communicate directly or via a network.

The edge device state, control commands, and the rule updates may be communicated using various network protocols including MQTT, a lightweight publish/subscribe messaging transport that may utilize a message broker to route messages; MQTT-SN, a connectionless publish/subscribe messaging transport designed for low bandwidth unreliable communication environments, which may be easily integrated with MQTT using a MQTT-SN to MQTT Bridge; AMQP 1.0, a full publish/subscribe messaging protocol that provides topics, queues, full message routing and a well-defined security model; HTTP, the standard client/server protocol of the World Wide Web; and CoAP, a RESTful client/server protocol for resource constrained devices and networks, which may be integrated with HTTP using a CoAP to HTTP Bridge.

Figure 6:
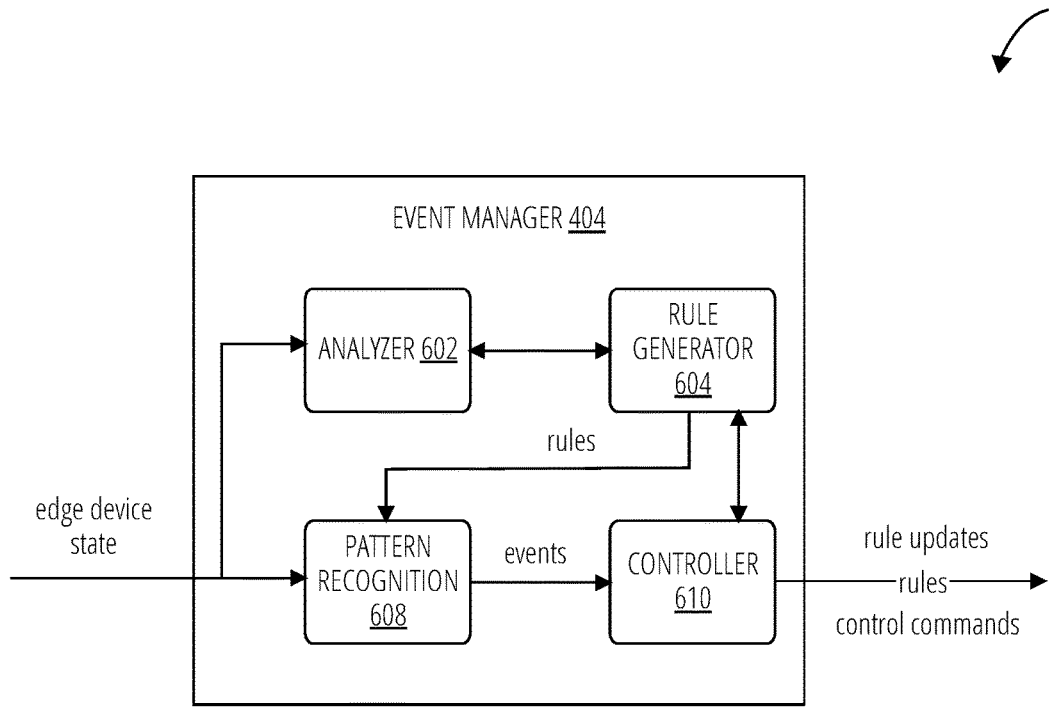
FIG. 6 illustrates an embodiment of an event management system 600.

The event manager 404 is further described in FIG. 6.

The rules implementation system 500 comprises a central control 402, a broker 406, an edge devices 408, and an event manager 404.

The edge devices 408 communicates the edge device state to the broker 406 and receives control commands and rule updates from the broker 406. The central control 402 sends control commands and rule updates to the broker 406 and receives signals from the broker 406.

The broker 406 receives the edge device state from the edge devices 408 and the control commands and rule updates from the central control 402. The broker 406 sends the control commands and the rule updates to the edge devices 408 and signals to the central control 402. A broker 406 may be utilized to perform functions that the edge devices 408 lack. The broker 406 may be located on the edge devices 408. The broker 406 may also be located on the same local area network as the edge devices 408. Each of the edge devices 408 may have a different broker 406. The edge devices 408 located on the same local area network may utilize the same broker 406.

The edge devices 408 communicates an edge device state to the central control 402. The central control 402 communicates control commands and rule updates to the edge devices 408. The central control 402 may communicate directly or via a network.

Referring to FIG. 6, an event management system 600 comprises an event manager 404, an analyzer 602, a rule generator 604, a pattern recognition 608, and a controller 610. The event manager 404 receives an edge device state and outputs rule updates and control commands.

The analyzer 602 receives the edge device state and sends an analyzed edge device state to the rule generator 604. The rule generator 604 receives an analyzed edge device state from the analyzer 602 and rules from the controller 610. The rule generator 604 generates rules and sends the rules to the pattern recognition 608 and the controller 610. The pattern recognition 608 receives the edge device state and the rules from the rule generator 604 and sends events to the controller 610. The controller 610 receives the rules from the rule generator 604 and the events from the pattern recognition 608. The controller 610 send the rules to the rule generator 604 and sends rule updates and control commands.

Figure 7:
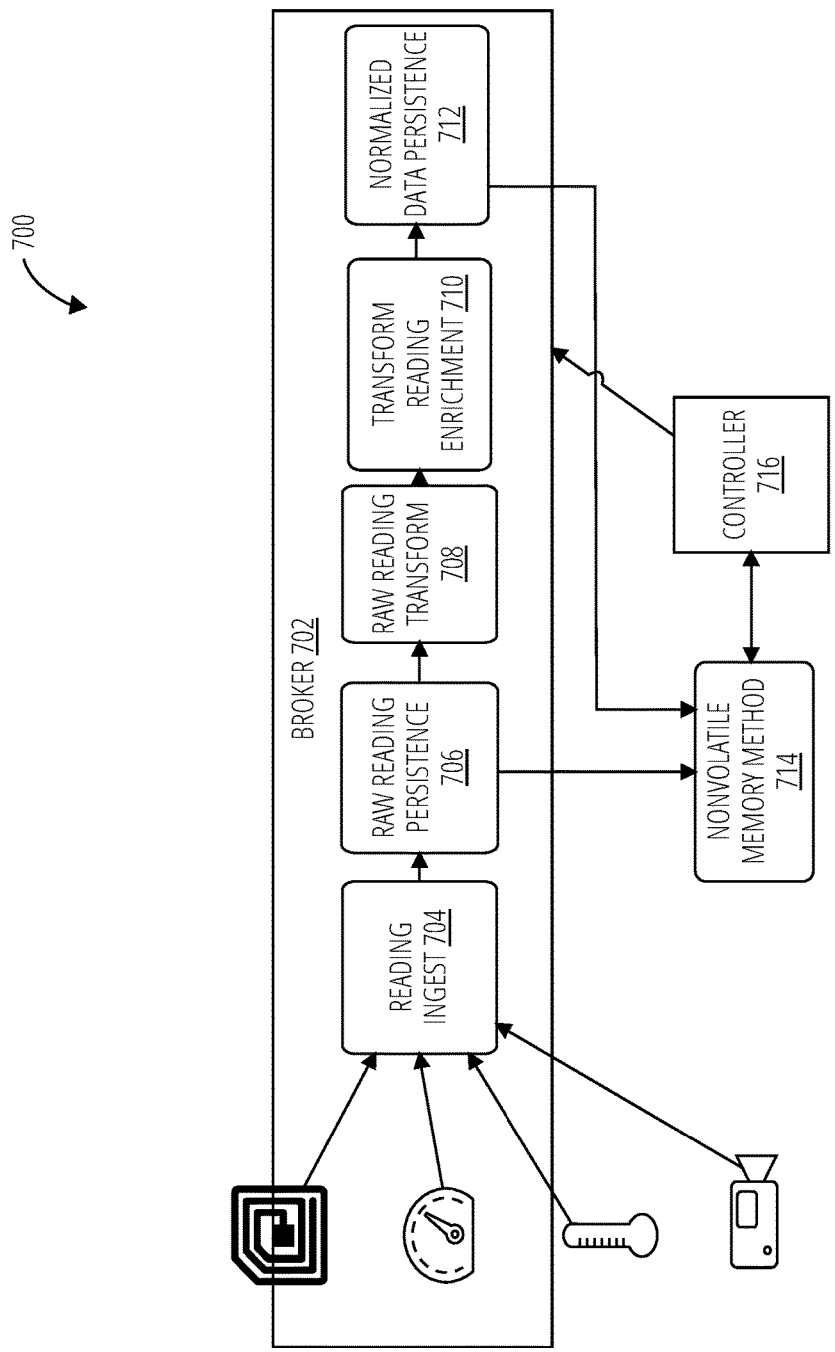
FIG. 7 illustrates an embodiment of a broker system 700.

Referring to FIG. 7, a broker system 700 comprises a broker 702 and a nonvolatile memory method 714. The broker 702 further comprises a reading ingest 704, a raw reading persistence 706, a raw reading transform 708, a transform reading enrichment 710, a normalized data persistence 712, and a controller 716.

The reading ingest 704 receives data from edge devices. The data may be edge device states transmitted by messages. The raw reading persistence 706 may be stored in the nonvolatile memory method 714 and/or transformed and enriched by the raw reading transform 708 and the transform reading enrichment 710, respectively, into the normalized data persistence 712. The normalized data persistence 712 may be stored in the nonvolatile memory method 714. The controller 716 may provide instructions to the broker 702 to manage each of the reading ingest 704, the raw reading persistence 706, the raw reading transform 708, the transform reading enrichment 710, and the normalized data persistence 712. The nonvolatile memory method 714 may store the instructions for the controller 716 to interact with the broker 702. In some embodiments, the controller 716 may send a request to the nonvolatile memory method 714 for instructions.

Figure 8:
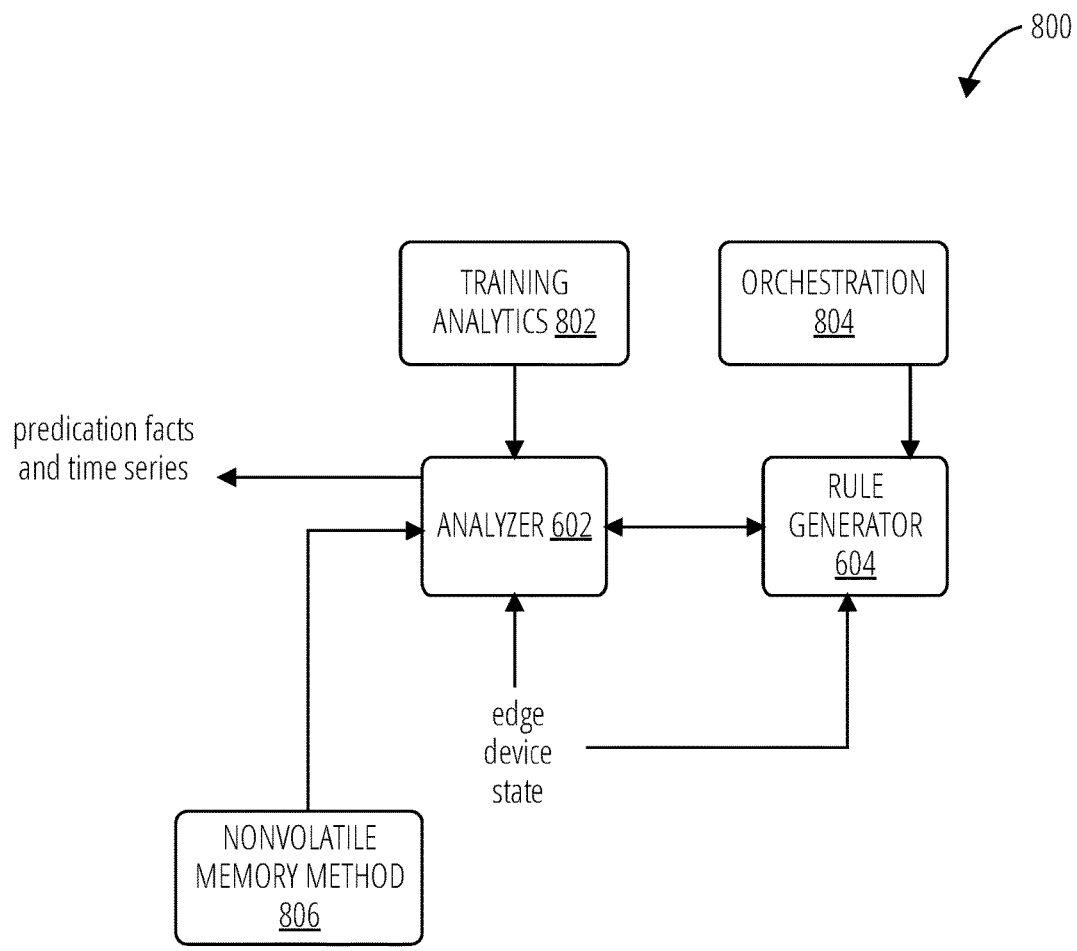
FIG. 8 illustrates an embodiment of a system 800.

Referring to FIG. 8, a system 800 comprises an analyzer 602, a rule generator 604, a training analytics 802, an orchestration 804, and a nonvolatile memory method 806.

The analyzer 602 receives an edge device state, rules from the rule generator 604, data from the training analytics 802, and data from the nonvolatile memory method 806. The analyzer 602 sends analyzed rules to the rule generator 604 and outputs predication facts and time series. The rule generator 604 receives the edge device state, analyzed rules from the analyzer 602, and orchestrated data from the orchestration 804, and sends generated rules to the analyzer 602. The training analytics 802 sends data to the analyzer 602. The orchestration 804 sends orchestrated data to the rule generator 604. The orchestrated data may comprises formatting data for the rules generated by the rule generator 604. The nonvolatile memory method 806 provides data to the analyzer 602 as is further described in FIG. 9.

Figure 9:
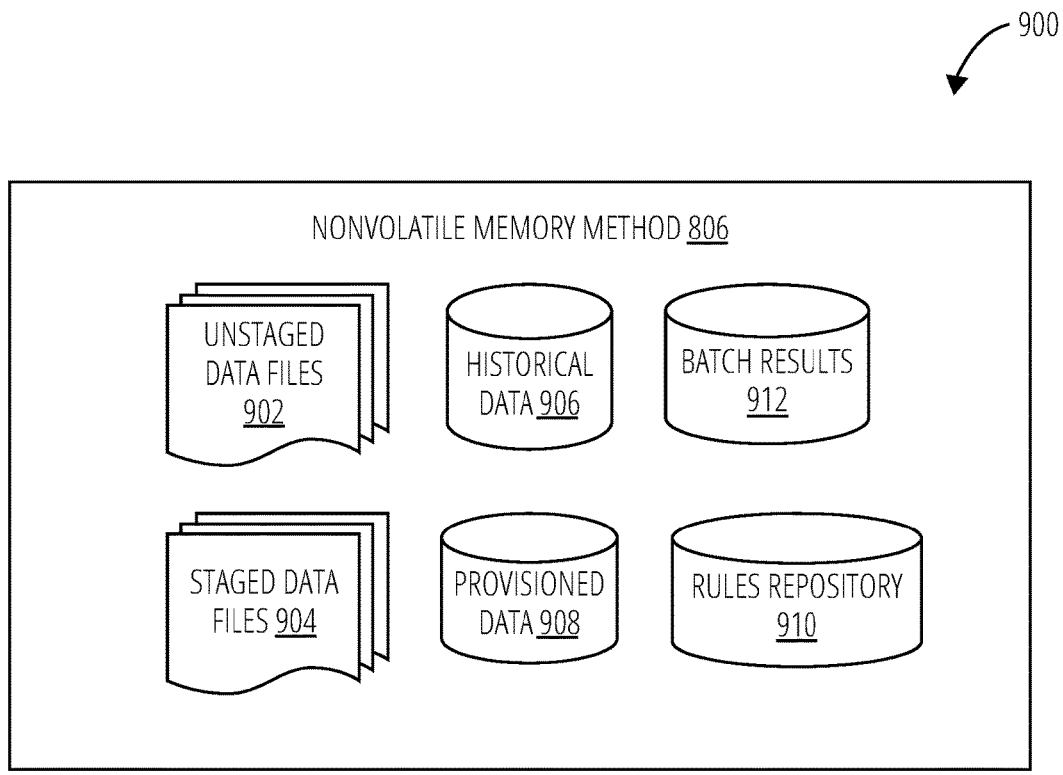
FIG. 9 illustrates an embodiment of a memory system 900.

Referring to FIG. 9, a memory system 900 comprises a nonvolatile memory method 806, which further comprises an unstaged data files 902, a staged data files 904, a historical data 906, a provisioned data 908, a rules repository 910, and a batch results 912.

The unstaged data files 902 may be controls commands or rule updates that are not ready to be sent to the edge devices 408. The nonvolatile memory method 806 may transform the unstaged data files 902 to the staged data files 904 when the controls commands and the rule updates are ready to be sent to the edge devices 408.

The staged data files 904 may comprise the control commands or the rule updates to be sent to the edge devices 408 by the central control 402. Prior to sending the staged data files 904 to the edge devices 408, the central control 402 may send control commands the edge devices 408 to determine if the edge devices 408 are prepared to receive the staged data files 904.

The historical data 906 may comprises previously received data from the edge devices 408 or further data generated by the central control 402. The provisioned data 908 may comprise data to configure setup of additional edge devices 408 or an additional service either on the edge devices 408 or the central control 402.

The rules repository 910 may comprise the rules whether active or inactive. The rules may also be operated locally on one of the edge devices 408 or run by the central control 402. The rules repository 910 may be accessed when an edge device state is received by the central control 402 that comprises a control to be evaluated by one or more rules. The batch results 912 may comprise edge device states received by a request message. The batch results 912 may be compared to the rules repository 910. The batch results 912 may be stored in the historical data 906.

Figure 10:
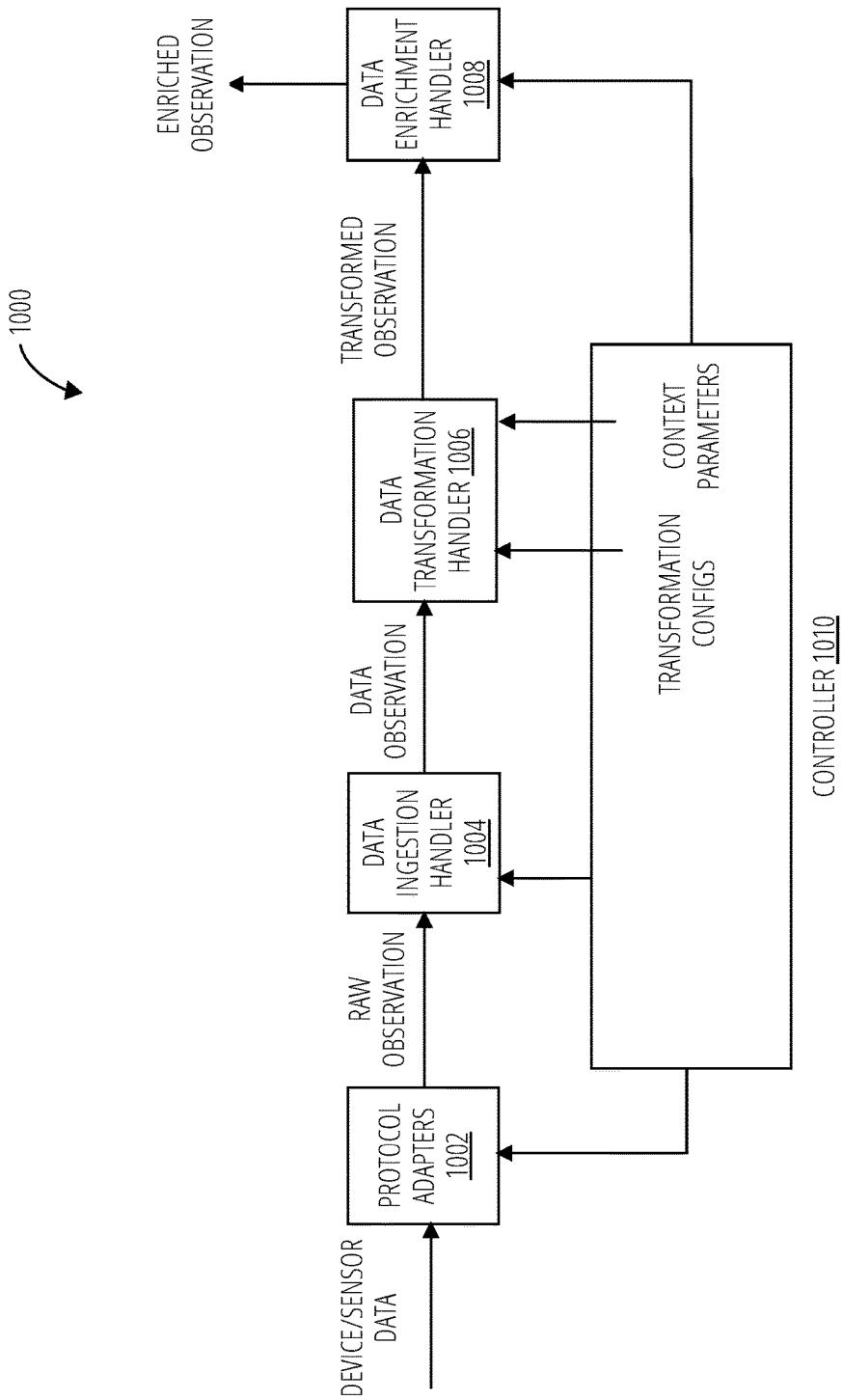
FIG. 10 illustrates an embodiment of a data transformation process 1000.

Referring to FIG. 10, a data transformation process 1000 comprises a controller 1010, a protocol adapters 1002, a data ingestion handler 1004, a data transformation handler 1006, and a data enrichment handler 1008.

The controller 1010 may provide instructions to the protocol adapters 1002, the data ingestion handler 1004, the data transformation handler 1006, and the data enrichment handler 1008. The instructions provide information to perform the action described below.

The protocol adapters 1002 receives device/sensor data and sends raw observation to the data ingestion handler 1004. The protocol adapters 1002 may have different adapters for different protocols. The protocol adapters 1002 check the incoming messages (e.g., device/sensor data) to determine whether the message is sent from a registered source. The protocol adapters 1002 fetches the 'sourceId' for the incoming messages, wraps data into the raw observation, and may send the raw observation to a data pipeline.

The raw observation may be in the following schema:

```
{
    "sourceId" : String,
    "observation" : byte [ ]
}
```

The data ingestion handler 1004 receives the raw observation from the protocol adapters 1002 and sends a data observation to the data transformation handler 1006. The data ingestion handler 1004 consumes messages from the pipeline, deserializes incoming messages against the raw observation schema, and debundles the observation bytes against a <K,V> map or a list of <K,V> maps. The data ingestion handler 1004 then decorates the data into the data observation and sends to the data transformation handler 1006.

The data observation may be in the following schema:

```
{
    "sourceId" : String
    "observation" :
    {
        "key1" : "value1",
        "key2" : "value2",
        "keyn" : "valuen"
    }
}
```

The data transformation handler 1006 receives the data observation from the data ingestion handler 1004 and sends a transformed observation to the data enrichment handler 1008. The data transformation handler 1006 fetches transformation configs based on the 'sourceId', applies the transformations based on the transformation configs, fetches the domain entity schema using the 'sourceId" and transforms each observation map against the entity schema. The data transformation handler 1006 then decorates the data into the transformed observation and sends to the data enrichment handler 1008.

The transformed observation may be in the following schema:

```
{
    "sourceId" : String
    "observation" :
    {
        "field1" : String,
        "field2" : int,
        "field3" : Date,
        "field4" :
        {
        },
        "field5" : List
    }
}
```

The data enrichment handler 1008 receives the transformed observation and produces an enriched observation. The data enrichment handler 1008 fetches context parameters for the observation and generates context information for the transformed observation. The data enrichment handler 1008 decorates the data into the enriched observation.

The enriched observation may be in the following schema:

```
{
    "data" :
    {
        "sourceId" : String
        "observation" :
        {
            "field1" : String,
            "field2" : int,
            "field3" : Date,
            "field4" :
            {
            },
            "field5" : List
        }
    }
    "context" :
    {
        "timestamp" : Date
    }
}
```

Figure 11:
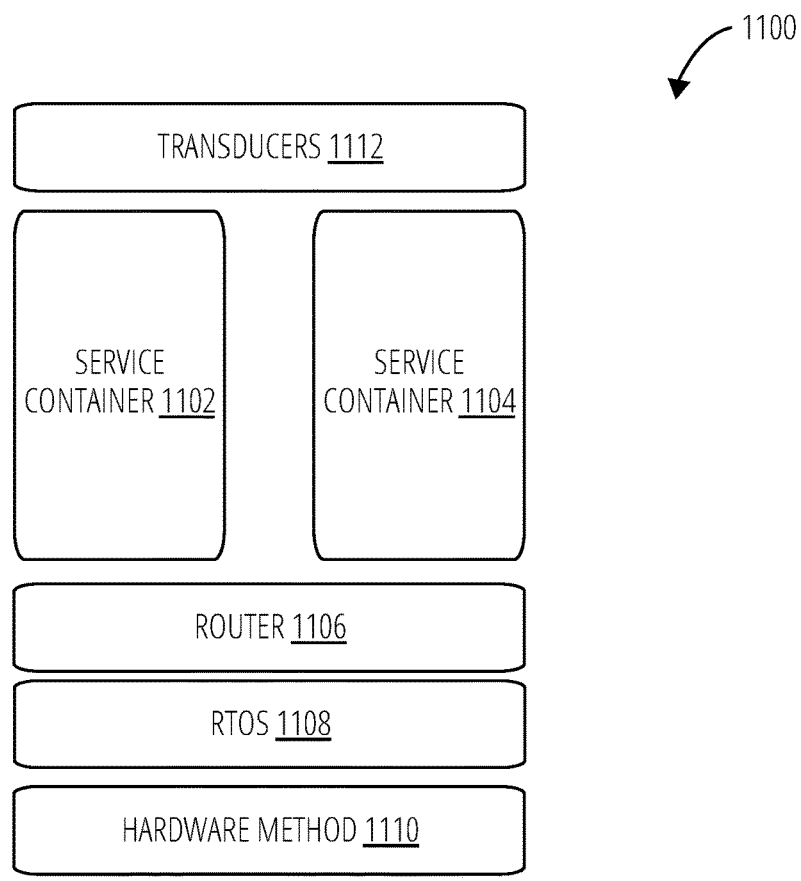
FIG. 11 illustrates an embodiment of a rules implementation system 1100.

Referring to FIG. 11, a rules implementation system 1100 comprises a service container 1102, a service container 1104, a router 1106, an RTOS 1108, a hardware method 1110, and transducers 1112. In some embodiments, the edge devices 408 comprise the rules implementation system 1100.

The service container 1102 and the service container 1104 may run applications that send and receive data from the transducers 1112. The router 1106 operates the service container 1102 and the service container 1104 to send and receive data from the transducers 1112. The RTOS 1108 may coordinate resources on the hardware method 1110 and may provide resources to the router 1106. The hardware method 1110 comprises physical components that may store the RTOS 1108 and may provide resources, such as, electricity via internal sources (e.g., battery) or converting an external energy source into electricity (e.g., transformer, solar cell, etc.).

The transducers 1112 may convert physical phenomenon into signals. The signals may be sent to the service container 1102 and/or the service container 1104. Signals may be received from the service container 1102 and the service container 1104 to generate data regarding the physical phenomenon and send a signal to the service container 1102 and/or the service container 1104 in response.

Figure 12:
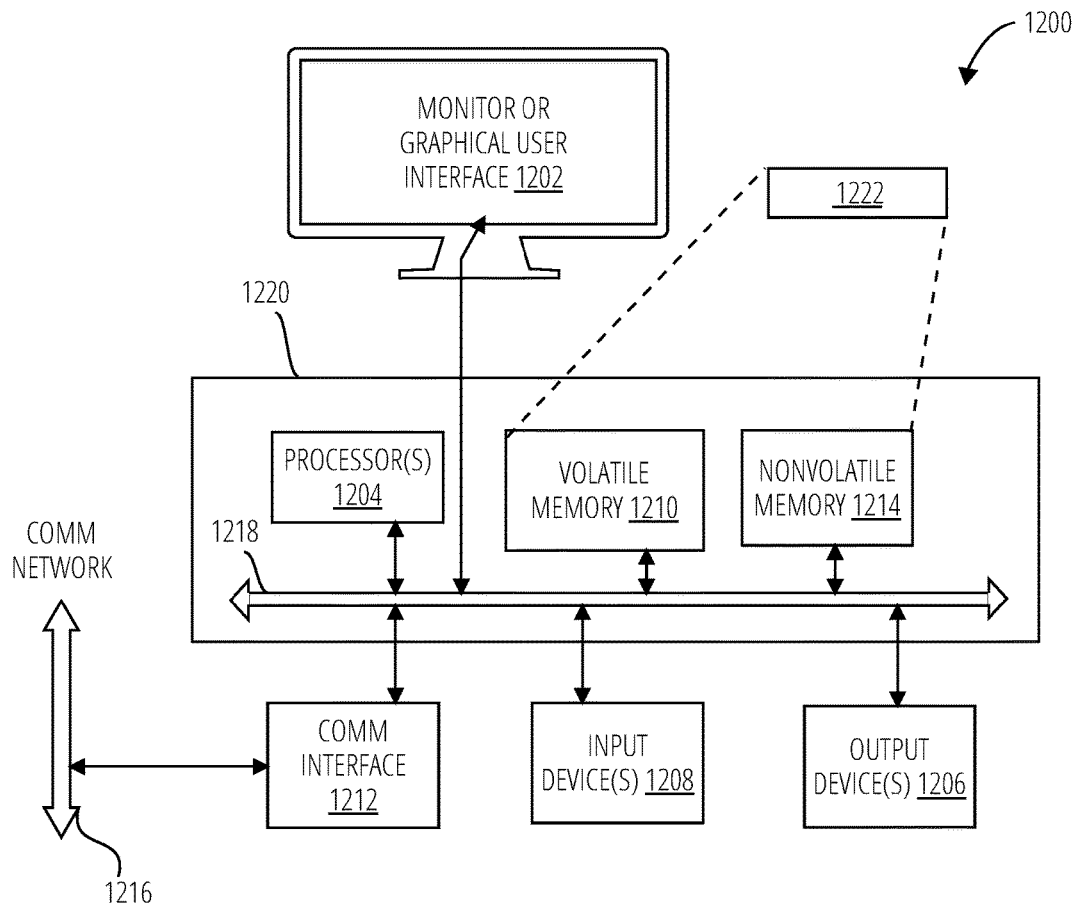
FIG. 12 is an example block diagram of a central control system 1200 that may incorporate embodiments of the present invention.

FIG. 12 is an example block diagram of a central control system 1200 that may incorporate embodiments of the present invention. FIG. 12 is merely illustrative of a machine system to carry out aspects of the technical processes described herein, and does not limit the scope of the claims. One of ordinary skill in the art would recognize other variations, modifications, and alternatives. In one embodiment, the central control system 1200 typically includes a monitor or graphical user interface 1202, a data processing system 1220, a communication network interface 1212, input device(s) 1208, output device(s) 1206, and the like.

As depicted in FIG. 12, the data processing system 1220 may include one or more processor(s) 1204 that communicate with a number of peripheral devices via a bus subsystem 1218. These peripheral devices may include input device(s) 1208, output device(s) 1206, communication network interface 1212, and a storage subsystem, such as a volatile memory 1210 and a nonvolatile memory 1214.

The volatile memory 1210 and/or the nonvolatile memory 1214 may store computer-executable instructions and thus forming logic 1222 that when applied to and executed by the processor(s) 1204 implement embodiments of the processes disclosed herein.

The input device(s) 1208 include devices and mechanisms for inputting information to the data processing system 1220. These may include a keyboard, a keypad, a touch screen incorporated into the monitor or graphical user interface 1202, audio input devices such as voice recognition systems, microphones, and other types of input devices. In various embodiments, the input device(s) 1208 may be embodied as a computer mouse, a trackball, a track pad, a joystick, wireless remote, drawing tablet, voice command system, eye tracking system, and the like. The input device(s) 1208 typically allow a user to select objects, icons, control areas, text and the like that appear on the monitor or graphical user interface 1202 via a command such as a click of a button or the like.

The output device(s) 1206 include devices and mechanisms for outputting information from the data processing system 1220. These may include speakers, printers, infrared LEDs, and so on as well understood in the art.

The communication network interface 1212 provides an interface to communication networks (e.g., communication network 1216) and devices external to the data processing system 1220. The communication network interface 1212 may serve as an interface for receiving data from and transmitting data to other systems. Embodiments of the communication network interface 1212 may include an Ethernet interface, a modem (telephone, satellite, cable, ISDN), (asynchronous) digital subscriber line (DSL), FireWire, USB, a wireless communication interface such as BlueTooth or WiFi, a near field communication wireless interface, a cellular interface, and the like.

The communication network interface 1212 may be coupled to the communication network 1216 via an antenna, a cable, or the like. In some embodiments, the communication network interface 1212 may be physically integrated on a circuit board of the data processing system 1220, or in some cases may be implemented in software or firmware, such as "soft modems", or the like.

The central control system 1200 may include logic that enables communications over a network using protocols such as HTTP, TCP/IP, RTP/RTSP, IPX, UDP and the like.

The volatile memory 1210 and the nonvolatile memory 1214 are examples of tangible media configured to store computer readable data and instructions to implement various embodiments of the processes described herein. Other types of tangible media include removable memory (e.g., pluggable USB memory devices, mobile device SIM cards), optical storage media such as CD-ROMS, DVDs, semiconductor memories such as flash memories, non-transitory read-only-memories (ROMS), battery-backed volatile memories, networked storage devices, and the like. The volatile memory 1210 and the nonvolatile memory 1214 may be configured to store the basic programming and data constructs that provide the functionality of the disclosed processes and other embodiments thereof that fall within the scope of the present invention.

Logic 1222 that implements embodiments of the present invention may be stored in the volatile memory 1210 and/or the nonvolatile memory 1214. Said software may be read from the volatile memory 1210 and/or nonvolatile memory 1214 and executed by the processor(s) 1204. The volatile memory 1210 and the nonvolatile memory 1214 may also provide a repository for storing data used by the software.

The volatile memory 1210 and the nonvolatile memory 1214 may include a number of memories including a main random access memory (RAM) for storage of instructions and data during program execution and a read only memory (ROM) in which read-only non-transitory instructions are stored. The volatile memory 1210 and the nonvolatile memory 1214 may include a file storage subsystem providing persistent (non-volatile) storage for program and data files. The volatile memory 1210 and the nonvolatile memory 1214 may include removable storage systems, such as removable flash memory.

The bus subsystem 1218 provides a mechanism for enabling the various components and subsystems of data processing system 1220 communicate with each other as intended. Although the communication network interface 1212 is depicted schematically as a single bus, some embodiments of the bus subsystem 1218 may utilize multiple distinct busses.

It will be readily apparent to one of ordinary skill in the art that the central control system 1200 may be a device such as a smartphone, a desktop computer, a laptop computer, a rack-mounted computer system, a computer server, or a tablet computer device. As commonly known in the art, the central control system 1200 may be implemented as a collection of multiple networked computing devices. Further, the central control system 1200 will typically include operating system logic (not illustrated) the types and nature of which are well known in the art.

Those having skill in the art will appreciate that there are various logic implementations by which processes and/or systems described herein can be effected (e.g., hardware, software, or firmware), and that the preferred vehicle will vary with the context in which the processes are deployed. If an implementer determines that speed and accuracy are paramount, the implementer may opt for a hardware or firmware implementation; alternatively, if flexibility is paramount, the implementer may opt for a solely software implementation; or, yet again alternatively, the implementer may opt for some combination of hardware, software, or firmware. Hence, there are numerous possible implementations by which the processes described herein may be effected, none of which is inherently superior to the other in that any vehicle to be utilized is a choice dependent upon the context in which the implementation will be deployed and the specific concerns (e.g., speed, flexibility, or predictability) of the implementer, any of which may vary. Those skilled in the art will recognize that optical aspects of implementations may involve optically-oriented hardware, software, and or firmware.

Those skilled in the art will appreciate that logic may be distributed throughout one or more devices, and/or may be comprised of combinations memory, media, processing circuits and controllers, other circuits, and so on. Therefore, in the interest of clarity and correctness logic may not always be distinctly illustrated in drawings of devices and systems, although it is inherently present therein. The techniques and procedures described herein may be implemented via logic distributed in one or more computing devices. The particular distribution and choice of logic will vary according to implementation.

The foregoing detailed description has set forth various embodiments of the devices or processes via the use of block diagrams, flowcharts, or examples. Insofar as such block diagrams, flowcharts, or examples contain one or more functions or operations, it will be understood as notorious by those within the art that each function or operation within such block diagrams, flowcharts, or examples can be implemented, individually or collectively, by a wide range of hardware, software, firmware, or virtually any combination thereof. Portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more processing devices (e.g., as one or more programs running on one or more computer systems), as one or more programs running on one or more processors (e.g., as one or more programs running on one or more microprocessors), as firmware, or as virtually any combination thereof, and that designing the circuitry or writing the code for the software or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, flash drives, SD cards, solid state fixed or removable storage, and computer memory.

In a general sense, those skilled in the art will recognize that the various aspects described herein which can be implemented, individually or collectively, by a wide range of hardware, software, firmware, or any combination thereof can be viewed as being composed of various types of circuitry.

Those skilled in the art will recognize that it is common within the art to describe devices or processes in the fashion set forth herein, and thereafter use standard engineering practices to integrate such described devices or processes into larger systems. At least a portion of the devices or processes described herein can be integrated into a network processing method via a reasonable amount of experimentation. Various embodiments are described herein and presented by way of example and not limitation.

Figure 13:
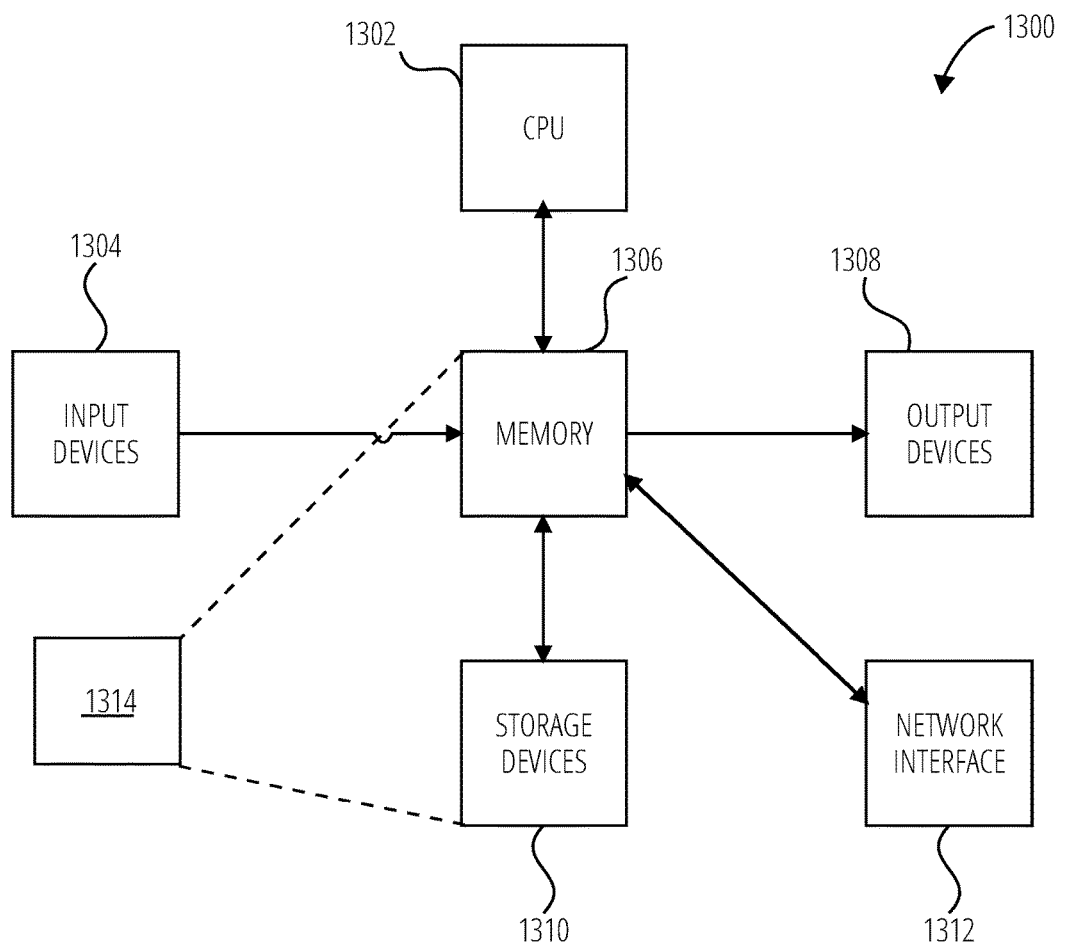
FIG. 13 illustrates an embodiment of a digital apparatus 1300 to implement components and process steps of the system described herein.

FIG. 13 illustrates an embodiment of a digital apparatus 1300 to implement components and process steps of the system described herein.

Input devices 1304 comprise transducers that convert physical phenomenon into machine internal signals, typically electrical, optical or magnetic signals. Signals may also be wireless in the form of electromagnetic radiation in the radio frequency (RF) range but also potentially in the infrared or optical range. Examples of input devices 1304 are keyboards which respond to touch or physical pressure from an object or proximity of an object to a surface, mice which respond to motion through space or across a plane, microphones which convert vibrations in the medium (typically air) into device signals, scanners which convert optical patterns on two or three dimensional objects into device signals. The signals from the input devices 1304 are provided via various machine signal conductors (e.g., busses or network interfaces) and circuits to memory 1306.

The memory 1306 is typically what is known as a first or second level memory device, providing for storage (via configuration of matter or states of matter) of signals received from the input devices 1304, instructions and information for controlling operation of the CPU 1302, and signals from storage devices 1310.

The memory 1306 and/or the storage devices 1310 may store computer-executable instructions and thus forming logic 1314 that when applied to and executed by the CPU 1302 implement embodiments of the processes disclosed herein.

Information stored in the memory 1306 is typically directly accessible to the CPU 1302 of the device. Signals input to the device cause the reconfiguration of the internal material/energy state of the memory 1306, creating in essence a new machine configuration, influencing the behavior of the digital apparatus 1300 by affecting the behavior of the CPU 1302 with control signals (instructions) and data provided in conjunction with the control signals.

Second or third level storage devices 1310 may provide a slower but higher capacity machine memory capability. Examples of storage devices 1310 are hard disks, optical disks, large capacity flash memories or other non-volatile memory technologies, and magnetic memories.

The CPU 1302 may cause the configuration of the memory 1306 to be altered by signals in storage devices 1310. In other words, the CPU 1302 may cause data and instructions to be read from storage devices 1310 in the memory 1306 from which may then influence the operations of CPU 1302 as instructions and data signals, and from which it may also be provided to the output devices 1308. The CPU 1302 may alter the content of the memory 1306 by signaling to a machine interface of memory 1306 to alter the internal configuration, and then converted signals to the storage devices 1310 to alter its material internal configuration. In other words, data and instructions may be backed up from memory 1306, which is often volatile, to storage devices 1310, which are often non-volatile.

Output devices 1308 are transducers which convert signals received from the memory 1306 into physical phenomenon such as vibrations in the air, or patterns of light on a machine display, or vibrations (i.e., haptic devices) or patterns of ink or other materials (i.e., printers and 3-D printers).

The network interface 1312 receives signals from the memory 1306 and converts them into electrical, optical, or wireless signals to other machines, typically via a machine network. The network interface 1312 also receives signals from the machine network and converts them into electrical, optical, or wireless signals to the memory 1306.

Terms used herein should be accorded their ordinary meaning in the relevant arts, or the meaning indicated by their use in context, but if an express definition is provided, that meaning controls.

"Circuitry" in this context refers to electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes or devices described herein, or a microprocessor configured by a computer program which at least partially carries out processes or devices described herein), circuitry forming a memory device (e.g., forms of random access memory), or circuitry forming a communications device (e.g., a modem, communications switch, or optical-electrical equipment).

"Firmware" in this context refers to software logic embodied as processor-executable instructions stored in read-only memories or media.

"Hardware" in this context refers to logic embodied as analog or digital circuitry.

"Logic" in this context refers to machine memory circuits, non transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

"Programmable device" in this context refers to an integrated circuit designed to be configured and/or reconfigured after manufacturing. The term "programmable processor" is another name for a programmable device herein. Programmable devices may include programmable processors, such as field programmable gate arrays (FPGAs), configurable hardware logic (CHL), and/or any other type programmable devices. Configuration of the programmable device is generally specified using a computer code or data such as a hardware description language (HDL), such as for example Verilog, VHDL, or the like. A programmable device may include an array of programmable logic blocks and a hierarchy of reconfigurable interconnects that allow the programmable logic blocks to be coupled to each other according to the descriptions in the HDL code. Each of the programmable logic blocks may be configured to perform complex combinational functions, or merely simple logic gates, such as AND, and XOR logic blocks. In most FPGAs, logic blocks also include memory elements, which may be simple latches, flip-flops, hereinafter also referred to as "flops," or more complex blocks of memory. Depending on the length of the interconnections between different logic blocks, signals may arrive at input terminals of the logic blocks at different times.

"Software" in this context refers to logic implemented as processor-executable instructions in a machine memory (e.g. read/write volatile or nonvolatile memory or media).

Herein, references to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other. Any terms not expressly defined herein have their conventional meaning as commonly understood by those having skill in the relevant art(s).

Various logic functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on.

Those skilled in the art will recognize that it is common within the art to describe devices or processes in the fashion set forth herein, and thereafter use standard engineering practices to integrate such described devices or processes into larger systems. At least a portion of the devices or processes described herein can be integrated into a network processing system via a reasonable amount of experimentation. Various embodiments are described herein and presented by way of example and not limitation.

Those having skill in the art will appreciate that there are various logic implementations by which processes and/or systems described herein can be effected (e.g., hardware, software, or firmware), and that the preferred vehicle will vary with the context in which the processes are deployed. If an implementer determines that speed and accuracy are paramount, the implementer may opt for a hardware or firmware implementation; alternatively, if flexibility is paramount, the implementer may opt for a solely software implementation; or, yet again alternatively, the implementer may opt for some combination of hardware, software, or firmware. Hence, there are numerous possible implementations by which the processes described herein may be effected, none of which is inherently superior to the other in that any vehicle to be utilized is a choice dependent upon the context in which the implementation will be deployed and the specific concerns (e.g., speed, flexibility, or predictability) of the implementer, any of which may vary. Those skilled in the art will recognize that optical aspects of implementations may involve optically-oriented hardware, software, and or firmware.

Those skilled in the art will appreciate that logic may be distributed throughout one or more devices, and/or may be comprised of combinations memory, media, processing circuits and controllers, other circuits, and so on. Therefore, in the interest of clarity and correctness logic may not always be distinctly illustrated in drawings of devices and systems, although it is inherently present therein. The techniques and procedures described herein may be implemented via logic distributed in one or more computing devices. The particular distribution and choice of logic will vary according to implementation.

The foregoing detailed description has set forth various embodiments of the devices or processes via the use of block diagrams, flowcharts, or examples. Insofar as such block diagrams, flowcharts, or examples contain one or more functions or operations, it will be understood as notorious by those within the art that each function or operation within such block diagrams, flowcharts, or examples can be implemented, individually or collectively, by a wide range of hardware, software, firmware, or virtually any combination thereof. Portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more processing devices (e.g., as one or more programs running on one or more computer systems), as one or more programs running on one or more processors (e.g., as one or more programs running on one or more microprocessors), as firmware, or as virtually any combination thereof, and that designing the circuitry or writing the code for the software or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, flash drives, SD cards, solid state fixed or removable storage, and computer memory.

In a general sense, those skilled in the art will recognize that the various aspects described herein which can be implemented, individually or collectively, by a wide range of hardware, software, firmware, or any combination thereof can be viewed as being composed of various types of circuitry.

What is claimed is:

1. A method comprising:
   receiving a raw data signal from one or more service abstraction layers;
   receiving an observation via a rule engine, the rule engine preconfigured with a rule set from a rule generator, the rule set comprising at least one condition and at least one consequence to trigger the generation of one or more input control signals and an event signal;
   transforming the one or more input control signals into one or more message control signals via a router;
   transforming the event signal into an action via an orchestration engine to implement an action to affect a machine state of one or more machines;
   transforming the one or more message control signals into one or more rule control signals via a bytecode local interpreter; and
   receiving the one or more message control signals with a network abstraction layer, the network abstraction layer transforming the one or more message control signals into a network control signal, the network abstraction layer sending the network control signal to further affect the machine state of the one or more machines.

2. The method of claim 1 further comprising a sanity testing component, the sanity testing component receiving a sanity test setup control signal, the sanity test setup control signal altering the sanity testing component to send a sanity test control signal to the router.

3. The method of claim 1 wherein the rule generator is configured via a user interface.

4. The method of claim 1 wherein the rule generator is positioned on an edge device.

5. The method of claim 1 further comprising a periodic message component, the periodic message component receiving a periodic rules setup control signal, the periodic rules setup control signal altering the periodic message component to send a periodic rules control signal to the router.

6. The method of claim 1 further comprising a threshold detecting component, the threshold detecting component receiving a threshold setup control signal, the threshold setup control signal comprising one or more thresholds, the threshold detecting component receiving the one or more message control signals, the threshold detecting component transforming the one or more message control signals into one or more threshold signals in response to the one or more thresholds being exceeded.

7. The method of claim 1 further comprising one or more edge devices, the one or more edge devices sending the one or more input control signals to the router, the one or more edge devices receiving the one or more message control signals from the router, the machine state of the one or more edge devices altered by the one or more message control signals.

8. The method of claim 7, further comprising wherein the one or more edge devices send an initiation control signal to the router, the initiation control signal comprising instructions for the router to receive the one or more input control signals and send the one or more message control signals to the one or more edge devices.

9. The method of claim 1 further comprising one or more interface abstraction layers.

10. The method of claim 1 further comprising a power management component.

11. The method of claim 1, wherein the router comprises a message control signal receiver and a message control signal sender.

12. The method of claim 11, wherein the message control signal sender sends the one or more message control signals to the one or more service abstraction layers.

13. The method of claim 11, wherein the message control signal sender sends the one or more message control signals to the network abstraction layer.

14. A computing apparatus, the computing apparatus comprising:
   a processor; and
   a memory storing instructions that, when executed by the processor, configure the apparatus to:
   receive a raw data signal from one or more service abstraction layers;
   receive an observation via a rule engine, the rule engine preconfigured with a rule set from a rule generator, the rule set comprising at least one condition and at least one consequence to trigger the generation of one or more input control signals and an event signal;
   transform the one or more input control signals into one or more message control signals via a router;
   transform the event signal into an action via an orchestration engine to implement an action to affect a machine state of one or more machines;
   transform the one or more message control signals into one or more rule control signals via a bytecode local interpreter; and
   receive the one or more message control signals with a network abstraction layer, the network abstraction layer transforming the one or more message control signals into a network control signal, the network abstraction layer sending the network control signal to further affect the machine state of the one or more machines.

15. The computing apparatus of claim 14 wherein the instructions further configure the apparatus to include a sanity testing component, the sanity testing component receiving a sanity test setup control signal, the sanity test setup control signal altering the sanity testing component to send a sanity test control signal to the router.

16. The computing apparatus of claim 14 wherein the rule generator is configured via a user interface.

17. The computing apparatus of claim 14 wherein the rule generator is positioned on an edge device.

18. The computing apparatus of claim 14 wherein the instructions further configure the apparatus to include a periodic message component, the periodic message component receiving a periodic rules setup control signal, the periodic rules setup control signal altering the periodic message component to send a periodic rules control signal to the router.

19. The computing apparatus of claim 14 wherein the instructions further configure the apparatus to include a threshold detecting component, the threshold detecting component receiving a threshold setup control signal, the threshold setup control signal comprising one or more thresholds, the threshold detecting component receiving the one or more message control signals, the threshold detecting component transforming the one or more message control signals into one or more threshold signals in response to the one or more thresholds being exceeded.

20. The computing apparatus of claim 14 wherein the instructions further configure the apparatus to include one or more edge devices, the one or more edge devices sending the one or more input control signals to the router, the one or more edge devices receiving the one or more message control signals from the router, the machine state of the one or more edge devices altered by the one or more message control signals.

21. The computing apparatus of claim 20, wherein the one or more edge devices send an initiation control signal to the router, the initiation control signal comprising instructions for the router to receive the one or more input control signals and send the one or more message control signals to the one or more edge devices.

22. The computing apparatus of claim 14 wherein the instructions further configure the apparatus to include one or more interface abstraction layers.

23. The computing apparatus of claim 14 wherein the instructions further configure the apparatus to include a power management component.

24. The computing apparatus of claim 14, wherein the router comprises a message control signal receiver and a message control signal sender.

25. The computing apparatus of claim 24, wherein the message control signal sender sends the one or more message control signals to the one or more service abstraction layers.

26. The computing apparatus of claim 24, wherein the message control signal sender sends the one or more message control signals to the network abstraction layer.

\* \* \* \* \*